(12) United States Patent
Pai et al.

(10) Patent No.: US 11,580,420 B2
(45) Date of Patent: Feb. 14, 2023

(54) DETERMINING FEATURE IMPACT WITHIN MACHINE LEARNING MODELS USING PROTOTYPES ACROSS ANALYTICAL SPACES

(71) Applicant: Adobe Inc., San Jose, CA (US)

(72) Inventors: Deepak Pai, Santa Clara, CA (US); Joshua Sweetkind-Singer, San Jose, CA (US); Debraj Basu, Los Angeles, CA (US)

(73) Assignee: Adobe Inc., San Jose, CA (US)

( * ) Notice: Subject to any disclaimer, the term of this patent is extended or adjusted under 35 U.S.C. 154(b) by 590 days.

(21) Appl. No.: 16/253,892

(22) Filed: Jan. 22, 2019

(65) Prior Publication Data

US 2020/0234158 A1 Jul. 23, 2020

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ........ G06N 20/00; G06N 20/10; G06N 20/20; G06N 5/04
See application file for complete search history.

(56) References Cited

PUBLICATIONS

Cortez et al., Using sensitivity analysis and visualization techniques to open black box data mining models, Information Sciences 225 (2013), Elsevier, pp. 1-17 (Year: 2013).*
Kewley et al., Data Strip Mining for the Virtual Design of Pharmaceuticals with Neural Networks, IEEE Transactions on Neural Networks, vol. 11, No. 3, May 2000, pp. 668-679 (Year: 2000).*
Bien et al., Classification by Set Cover: The Prototype Vector Machine, arXiv:0908.2284v1, Aug. 17, 2009, pp. 1-24 (Year: 2009).*
Marchiori, Elena, Class Conditional Nearest Neighbor for Large Margin Instance Selection, IEEE Transactions on Pattern Analysis and Machine Intelligence, vol. 32, No. 2, Feb. 2010, pp. 364-370 (Year: 2010).*
Parades et al., Learning prototypes and distances: A prototype reduction technique based on nearest neighbor error minimization, Pattern Recognition 39 (2006), Elsevier Ltd., 2005, pp. 180-188 (Year: 2006).*
Jacob Bien, Robert Tibshirani, "Prototype Selection for Interpretable Classification", 2012.

(Continued)

*Primary Examiner* — Li B. Zhen
*Assistant Examiner* — William Wai Yin Kwan
(74) *Attorney, Agent, or Firm* — Keller Preece PLLC

(57) ABSTRACT

Methods, systems, and non-transitory computer readable storage media are disclosed for analyzing feature impact of a machine-learning model using prototypes across analytical spaces. For example, the disclosed system can identify features of data points used to generate outputs via a machine-learning model and then map the features to a feature space and the outputs to a label space. The disclosed system can then utilize an iterative process to determine prototypes from the data points based on distances between the data points in the feature space and the label space. Furthermore, the disclosed system can then use the prototypes to determine the impact of the features within the machine-learning model based on locally sensitive directions; region variability; or mean, range, and variance of features of the prototypes.

20 Claims, 9 Drawing Sheets

(56) References Cited

PUBLICATIONS

Marco Tulio Ribeiro, Sameer Singh, Carlos Guestrin, "Why Should I Trust You?: Explaining the Predictions of Any Classifier", 2016.
Zachary C. Lipton, "The Mythos of Model Interpretability", 2017.
Been Kim, Rajiv Khanna, Oluwasanmi Koyejo, "Examples are not Enough, Learn to Criticize! Criticism for Interpretability", 2016.
Chenyue Wu, Esteban G. Tabak, "Prototypal Analysis and Prototypal Regression", 2017.
Riccardo Guidotti, Anna Monreale, Salvatore Ruggieri, Franco Turini, Dino Pedreschi, Fosca Giannotti, "A Survey of Methods for Explaining Black Box Models", 2018.
Lisa Anne Hendricks, Ronghang Hu, Trevor Darrell, Zeynep Akata, Generating Counterfactual Explanations with Natural Language, 2018.
Nikaash Puri, Piyush Gupta, Pratiksha Agarwal, Sukriti Verma, Balaji Krishnamurthy, "MAGIX: Model Agnostic Globally Interpretable Explanations," 2017.
R Dennis Cook and Sanford Weisberg. Residuals and influence in regression. New York: Chap-man and Hall, 1982.
Trevor J Hastie and Robert J Tibshirani. Generalized additive models, vol. 43. CRC press, 1990.
Benjamin Letham, Cynthia Rudin, Tyler H McCormick, David Madigan, et al. Interpretable classifiers using rules and bayesian analysis: Building a better stroke prediction model. The Annals of Applied Statistics, 9(3):1350-1371, 2015.
Satoshi Hara, Kouichi Ikeno, Tasuku Soma, Takanori Maehara. "Maximally Invariant Data Perturbation as Explanation", 2018.
Bryce Goodman, Seth Flaxman. "European Union regulations on algorithmic decision-making and a right to explanation", 2016.

* cited by examiner

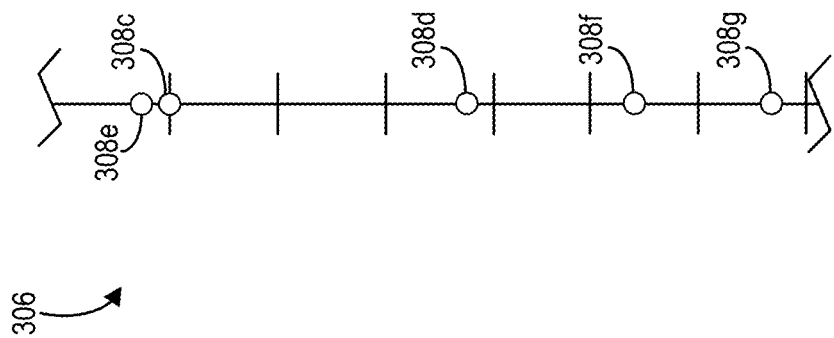
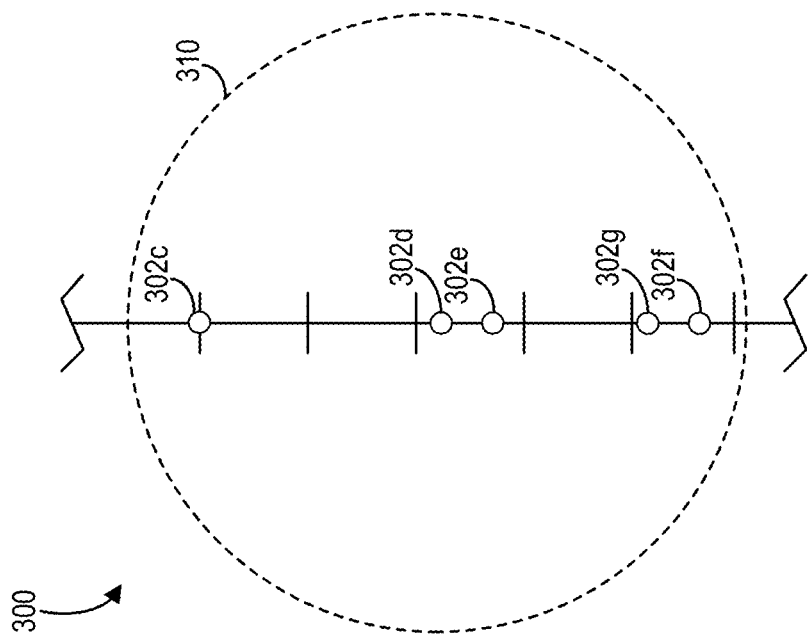

DETERMINING FEATURE IMPACT WITHIN MACHINE LEARNING MODELS USING PROTOTYPES ACROSS ANALYTICAL SPACES

BACKGROUND

Machine-learning models are increasingly prevalent in many different areas of computing technology. Implementing machine-learning in computing systems results in improved system performance and predictions, allowing computing systems to more accurately and efficiently generate and provide digital content, predict future results, and implement improved strategies. Machine-learning models thus often provide accurate predictive systems that learn behaviors and patterns from various model inputs.

Because machine-learning is being used increasingly in conventional systems, understanding the inner workings of machine-learning models is increasingly important. While machine-learning models can often provide more accurate and reliable predictive systems than other methods, many machine-learning models are essentially black boxes that provide little or no transparency of the functionality of the models. Specifically, the decision-making process employed by computer processors implementing black box machine-learning models is not interpretable based on the inputs and outputs of the models.

Because conventional systems lack interpretability, such models have a number of shortcomings. For instance, machine-learning models can learn patterns incorrectly based on variables that may be highly correlated, but not causally related, resulting in inaccurate outputs of the models. For example, in the context of self-driving vehicles that use machine-learning to identify objects (e.g., other vehicles or pedestrians) and then make decisions based on those identities, incorrectly identifying causal relationships between variables can result in biases in targeted vehicle collisions. Moreover, the lack of transparency also undermines confidence in the resulting output. Indeed, because of this lack of transparency, machine learning models are often viewed as undependable or untrustworthy. Furthermore, because the inner workings of machine learning models are often unknown, conventional systems often waste computing resources by providing and analyzing inputs that have little or no bearing on the results.

Some conventional systems analyze the inputs and outputs of black box models in an attempt to interpret the inner workings of the models. For example, some conventional systems use methods that can be useful for models that learn monotonic response functions but lack the ability to learn non-monotonic response functions in complex models (e.g., neural networks, gradient boosted trees). Such conventional systems lack flexibility because they can assist in interpreting simple machine-learning models but fail in complex models. Other conventional systems use methods that attempt to interpret more complex models with non-monotonic response functions. These conventional systems, however, typically experience a trade-off between interpretability and accuracy of results explaining model behavior (e.g., results that are easy to understand, but inaccurate, or results that are accurate, but difficult to understand). In addition, conventional systems generally require significant computing resources in analyzing data repositories utilized to train or test machine-learning models. Accordingly, conventional systems for interpreting behavior of machine-learning models lack flexibility, efficiency, accuracy, and/or interpretability.

SUMMARY

One or more embodiments provide benefits and/or solve one or more of the foregoing or other problems in the art with systems, methods, and non-transitory computer readable storage media that determine feature impact within a machine-learning model using representative prototypes across analytical spaces. More particularly, the disclosed systems select prototypes representative of data points in a dataset based on distances between data points in a feature space (e.g., space mapping input features of the machine learning model) and a label space (e.g., a space mapping output labels of the machine learning model). The disclosed systems select prototypes that cover (in the feature space) data points closest to them (in the label space) while covering (in the feature space) fewer data points farther away (in the label space). Furthermore, the disclosed systems limit the number of prototypes for representing the data points for the machine-learning model to reduce the number of points used when analyzing the functionality of the machine-learning model. The disclosed systems then use the prototypes to determine the impact of the features on the machine-learning model. In particular, the disclosed systems can accurately and efficiently generate explanations and insights into the inner-workings of the machine-learning model by contrasting and analyzing the representative prototypes.

For example, in one or more embodiments, the disclosed systems map features of a plurality of data points to a feature space and map outputs of a machine-learning model to a label space. The disclosed systems then determine, for each candidate prototype, distances between the candidate prototype and data points in an epsilon ball of the feature space and between the outputs in the label space. Using the determined distances, the disclosed system can select prototypes from the candidate prototypes by utilizing an integer linear program to iteratively analyze the data points to minimize the number of prototypes selected for the epsilon ball size while selecting prototypes that cover similarly-treated data points. The disclosed systems can then determine the sensitivity/variability of the features of the data points within the machine-learning model by analyzing the prototypes. Thus, the disclosed systems can efficiently, flexibly, and accurately select prototypes from a plurality of data points to determine the impact of data point features on a machine-learning model.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 3A-3D illustrate graph diagrams of prototype selection for a machine-learning model in accordance with one or more implementations;

DETAILED DESCRIPTION

Figure 1:
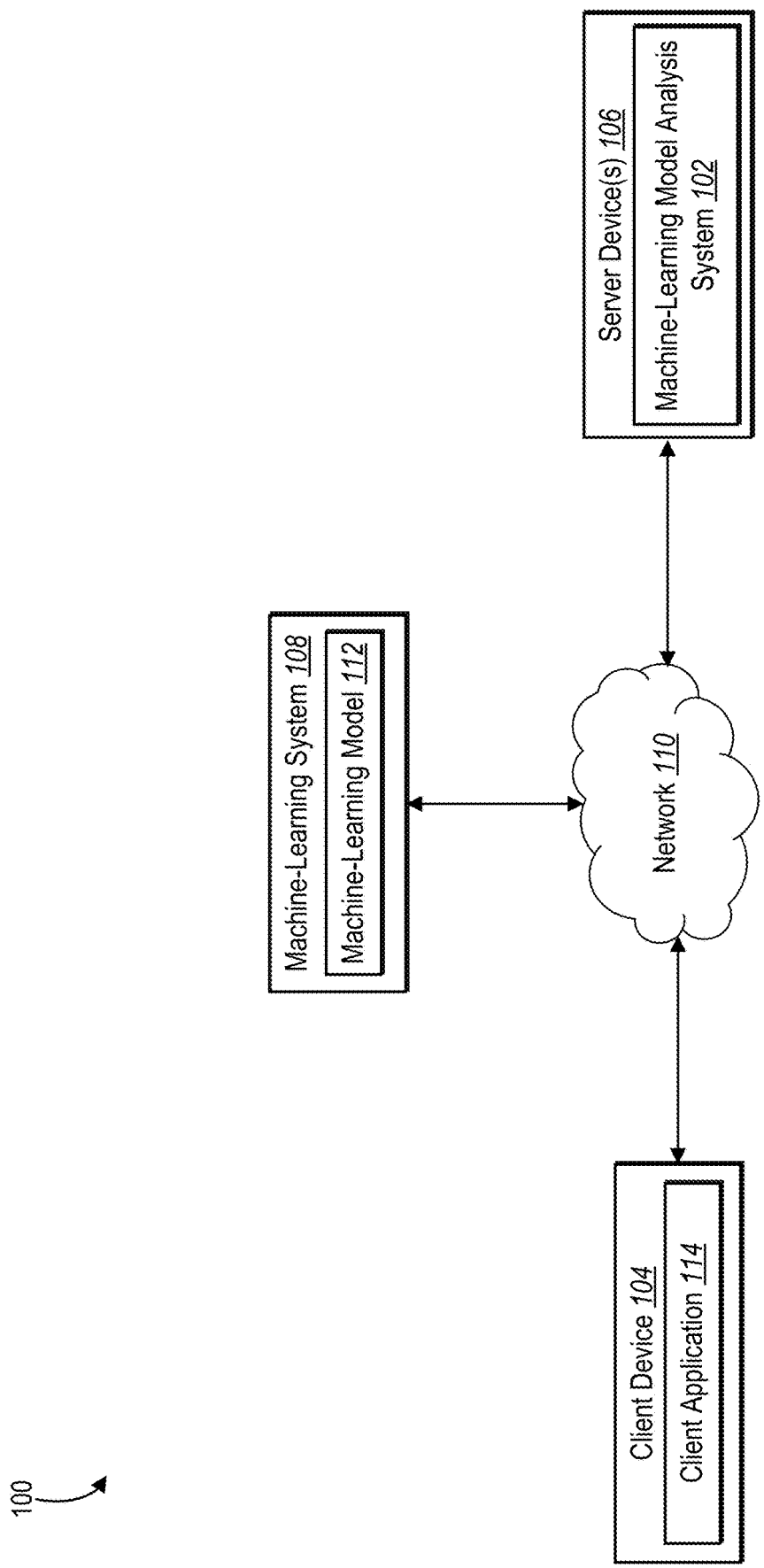
FIG. 1 illustrates an example environment in which a machine-learning model analysis system can operate in accordance with one or more implementations.

One or more embodiments of the present disclosure include a machine-learning model analysis system (also "model analysis system") that intelligently selects and uses prototypes to determine an impact of data points features within machine-learning models. In one or more embodiments, the model analysis system iteratively selects representative examples ("prototypes") that represent other data points for which a machine-learning model behaves similarly. Specifically, a prototype selected from the data points covers (in a feature space) other data points that have similar output data from the machine-learning model while not covering data points that do not have similar output data. The model analysis system can then analyze the prototypes to determine the impact the features of the data points have within the machine-learning model. The model analysis system can thus identify a small subset of data points to accurately and efficiently analyze the functionality of a machine-learning model.

As mentioned, the model analysis system can determine functionality of a machine-learning model based on the inputs and outputs of the model by selecting prototypes from a plurality of data points to determine an impact of features of the data points on outputs of the machine-learning model. For example, in one or more embodiments, the model analysis system first selects the prototypes according to a set of criteria using integer linear programming. To illustrate, the model analysis system selects prototypes that are within a threshold distance of other data points in the feature space, where the other data points are also in close proximity to the prototype within the label space. Furthermore, the model analysis system minimizes the total number of prototypes to improve efficiency and speed of analyzing feature impact within machine-learning models.

As discussed above, the model analysis system can select prototypes from a plurality of data points corresponding to a machine learning model. Specifically, the model analysis system can generate outputs based on features of data points utilizing the machine learning model (and then analyze the features and outputs to determine prototypes). For example, in one or more embodiments, the model analysis system utilizes a machine-learning model to analyze features of data points in a dataset and generate outputs corresponding to the data points based on those features. For example, the machine-learning model can provide predictions for data points based on a set of features of the data points. The model analysis system then maps the features of the data points to a feature space and maps the outputs of the model to a label space.

Once the model analysis system has mapped the features to the feature space and the outputs to the label space, the model analysis system can determine distances between the data points in the feature space and the label space. In particular, in one or more embodiments the model analysis system identifies, for a given data point in the feature space, data points that are within an epsilon ball of the given data point. The model analysis system then determines distances between the outputs of the identified data points in the label space.

In one or more embodiments, the model analysis system uses the distances between data points in the feature space and the label space to select representative prototypes from the data points. Specifically, the model analysis system can select prototypes to represent data points with similar features and determine how the machine-learning model treats each of the data points according to the outputs of the analyzed data points. For example, in one or more embodiments the model analysis system performs an iterative process to select prototypes for the model using the distances between the data points in the feature space and the label space. For example, the model analysis system can perform an analysis that determines whether to select a candidate prototype as a prototype based on other data points within an epsilon ball corresponding to the candidate prototype. More particularly, the model analysis system uses an optimization algorithm that selects prototypes that meet the coverage criteria mentioned above for each data point and continues analyzing each data point in the dataset until the model analysis system selects the best prototypes for representing the data points in the dataset.

As mentioned above, according to one or more embodiments the model analysis system uses the prototypes to determine the impact of the features of the data points within the machine-learning model (i.e., how the machine-learning model uses the features to generate the outputs). In particular, the model analysis system can utilize one or more metrics or algorithms based on the selected prototypes to determine feature impact on the machine-learning model. To illustrate, the model analysis system can generate a gradient based on relative distances between data points and prototypes. Additionally, the model analysis system can analyze the number of prototypes selected for separate regions of the feature space or label space and then compare the variability between the regions. Furthermore, the model analysis system can utilize mean, range, and variance of the outputs of prototypes relative to a test point. The model analysis system can thus use one or more of the above processes for analyzing the impact of the features within the machine-learning model.

As mentioned, the model analysis system provides a number of advantages over conventional systems. For example, the model analysis system improves the accuracy, efficiency, and flexibility of computing systems utilizing one or more machine-learning models. In particular, as discussed above, the model analysis system can determine the impact of particular features within a (previously black-box) machine learning model. Specifically, the model analysis system improves accuracy by using an iterative process to select, from a plurality of data points in a dataset, a plurality of representative prototypes based on distances between data points, allowing the model analysis system to accurately determine the impact of the features of the data points while providing interpretable results. By providing insight into the inner-workings of machine-learning models, the model analysis system improves dependability of and confidence in machine learning models. Moreover, the model analysis system also improves efficiency, by allowing implementing systems to focus resources on features that significantly impact results.

Furthermore, the model analysis system improves the processing efficiency of computing devices implementing a process for analyzing the functionality of a machine-learning model by analyzing a small subset of data points as prototypes. By analyzing prototypes, the model analysis system reduces the amount of processing resources and time needed to analyze the machine-learning model. More specifically, the model analysis system minimizes the number of prototypes to cover the dataset and reduce the amount of time to accurately analyze the machine-learning model.

Additionally, the model analysis system improves the flexibility of computing devices implementing a process for analyzing the functionality of a machine-learning model. In particular, by selecting prototypes based on distance information in the feature space and the label space of a machine-learning model, the model analysis system provides flexibility in analyzing both simple and complex machine-learning models without sacrificing either accuracy or interpretability. In contrast, as mentioned, conventional systems that analyze simple models are typically unable to accurately analyze complex models, while conventional systems that analyze more complex models often do so at the expense of accuracy or interpretability.

As illustrated by the foregoing discussion, the present disclosure utilizes a variety of terms to describe features and advantages of the model analysis system. Additional detail is now provided regarding the meaning of the terms. For example, as used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks (e.g., convolutional neural networks or recurrent neural networks), deep learning, etc. Thus, a machine-learning model makes high-level abstractions in data by generating data-driven predictions or decisions from the known input data.

As used herein, the term "data point" refers to a sample, example, specimen, object, and/or element within a dataset. In particular, the term data point includes an element of a dataset that comprises one or more features. For example, in a dataset of housing within a city, a data point can include an element within the dataset describing a particular home. As mentioned, a data point can include features (e.g., size of the house) and outputs corresponding to the data point (e.g., predicted price of the house).

As used herein, the term "feature" refers to a value that describes a data point. Specifically, a feature can include a value that indicates a specific characteristic or attribute of a data point. A feature can include a value for an attribute category that corresponds to a data point. For example, the set of features available for a data point can vary depending on what the data point represents. To illustrate, a data point representing a specific house in a region can include features that describe a square footage of the house, the number/type of rooms, the location, etc. As described in more detail below, a machine-learning model uses the features to determine an output for a data point. Accordingly, different features values for different data points result in different outputs of the machine-learning model.

As used herein, the term "feature space" refers to a space reflecting features of data points. Specifically, a feature space can reflect one or more dimensions corresponding to one or more features. For instance, the model analysis system can map features of data points to locations within different dimensions of a feature space. For instance, for a dataset include a set of ten features for each of the data points, a feature space can include ten dimensions to which each of the data points is mapped based on the values of the corresponding features. Accordingly, similar features can be mapped closer together within the feature space than features that are not similar.

Also, as used herein, the term "label space" refers to a space reflecting outputs of a machine-learning model. In particular, a label space can have a dimension that corresponds to an output of a machine learning model. For instance, a machine-learning model can generate an output (e.g., prediction) for each data point in a dataset. The model analysis system can then map the output of each data point to the label space. Accordingly, outputs that are similar (e.g., predictions with similar values) are mapped closer together within the label space than outputs that are not similar.

As used herein, the term "prototype" refers to a data point selected for analyzing a machine-learning model. Specifically, a prototype includes a data point from a dataset that the model analysis system determines represents one or more other data points in the dataset. In one or more embodiments, the model analysis system determines prototypes based on a set of criteria that includes selecting prototypes that cover more data points with similar targets (e.g., similar outputs), selecting prototypes that cover fewer data points with targets farther away, and selecting the fewest number of prototypes for a given epsilon ball size in the feature space. Accordingly, a prototype covers data points with similar features that the model analysis system treats similarly when generating outputs (e.g., predictions) based on those features.

As used herein, the term "impact" refers to a measure of change to an output of a machine-learning model as a result of a feature input to the machine-learning model. For example, an impact of a feature within a machine-learning model can include an increase or a decrease of an output value by changing a value of the feature. Accordingly, the impact of a feature can have direct correlation, an inverse correlation, other correlation, or no correlation to an output of a machine-learning model. As discussed in greater detail below, the model analysis system can determine impact using a variety of different measures, including a gradient within a label space; a number of porotypes within a label space; or mean, range, and variance of prototypes.

As used herein, the terms "mean," "variance," and "range" refer to statistical values associated with data points in a label space or a feature space. In particular, the model analysis system can calculate a statistical mean, statistical variance (e.g., standard deviation), or statistical range of machine-learning model outputs associated with data points to use in comparing against a selected data point. The mean, variance, and range can allow the model analysis system to determine whether an input data distribution, noise, richness/complexity of the machine-learning model, or other irregularities cause dissimilar behavior between the selected data point and nearby prototypes. In another example, the model analysis system can calculate a mean, variance, or range of features of prototypes relative to a selected data point.

Additional detail will now be provided regarding the model analysis system in relation to illustrative figures portraying exemplary implementations. To illustrate, FIG. 1 includes an embodiment of an environment 100 in which a machine-learning model analysis system 102 can operate. In particular, the environment 100 includes a client device 104, server device(s) 106, and a machine-learning system 108 in communication via a network 110. The machine-learning system 108 includes a machine-learning model 112. Moreover, as shown, the client device 104 includes a client application 114.

As mentioned, the machine-learning system 108 includes a machine-learning model 112. The machine-learning model 112 can be any machine-learning model for generating predictions for a plurality of data points in a dataset. In one or more embodiments, the machine-learning system 108 includes, is part of, or is otherwise associated with another system that provides the dataset to the machine-learning model 112 to generate outputs for the dataset. For example, the machine-learning system 108 can be part of the same system as the server device(s) 106 or part of a different system. In particular, the machine-learning system 108 obtains data points from a dataset (e.g., by communicating with a third-party system) and feeds information for the data points into the machine-learning model. More specifically, the machine-learning model 112 can input features of the data points into the machine-learning model 112 to generate outputs based on those features.

Accordingly, the outputs depend on the dataset that the machine-learning model 112 analyzes. For instance, for a dataset comprising data points corresponding to residential houses, the machine-learning model 112 can output predictions of prices for the residential houses. Similarly, for a dataset comprising data points corresponding to individuals in a health study, the machine-learning model 112 can output a prediction of whether the individuals will contract a specific disease. In an additional example, the machine-learning model 112 can utilize a dataset of data points associated with users or user devices to output predictions related to digital content that the users are likely to consume for providing digital content to the users/user devices.

The server device(s) 106 include the model analysis system 102 in communication with the machine-learning system 108 and the client device 104 via the network 110. The model analysis system 102 can perform operations associated with analyzing the machine-learning model 112 to determine a functionality of the machine-learning model 112. In one or more embodiments, a user of the client device 104 uses a client application 114 to send a request to the model analysis system 102 at the server device(s) 106 to provide an analysis of the machine-learning model 112. The model analysis system 102 can then provide the resulting analysis to the client device 104, and the user can view the analysis of the machine-learning model 112 within the client application 114 (or another application) at the client device 104.

To generate the analysis of the machine-learning model 112, the model analysis system 102 uses inputs and outputs of the machine-learning model 112. In particular, the model analysis system 102 analyzes the features of data points analyzed by the machine-learning model 112 in a feature space and outputs of the machine-learning model 112 in a label space. The model analysis system 102 determines distances between the data points in the feature space and the label space (i.e., based on the features and outputs). The model analysis system 102 then uses the distances to determine prototypes that are representative of similar data points while also minimizing the number of prototypes for covering the data points in the dataset.

After determining the prototypes, the model analysis system 102 uses the prototypes to analyze the impact of features within the machine-learning model 112. Specifically, the model analysis system 102 analyzes properties of the prototypes using one or more algorithms to determine how the features of the data points analyzed by the machine-learning model 112 affect the outputs of the machine-learning model 112. For instance, the model analysis system 102 can generate a gradient to analyze the direction of local sensitivity of the prototypes, compare the number of prototypes within two or more regions to determine a variability of the regions, and/or analyze the variation in the locality of a data point based on mean, range, and variance of the prototypes near the data point. The model analysis system 102 can then generate a report to provide to the client device 104 for the user to view within the client application 114.

Although the environment of FIG. 1 is depicted as having various components, the environment 100 may have any number of additional or alternative components (e.g., any number of server devices, client devices, machine-learning systems, or other components in communication with the model analysis system 102). For example, the model analysis system 102 can allow any number of users associated with any number of client devices to generate reports for any number of machine-learning models. Furthermore, the model analysis system 102 can communicate with (or include) any number of machine-learning systems to access datasets for analyzing corresponding machine-learning models. Additionally, more than one component or entity in the environment 100 can implement the operations of the model analysis system 102 described herein. For instance, the model analysis system 102 can alternatively be implemented entirely (or in part) on the client device 104 or on separate client devices.

Figure 2:
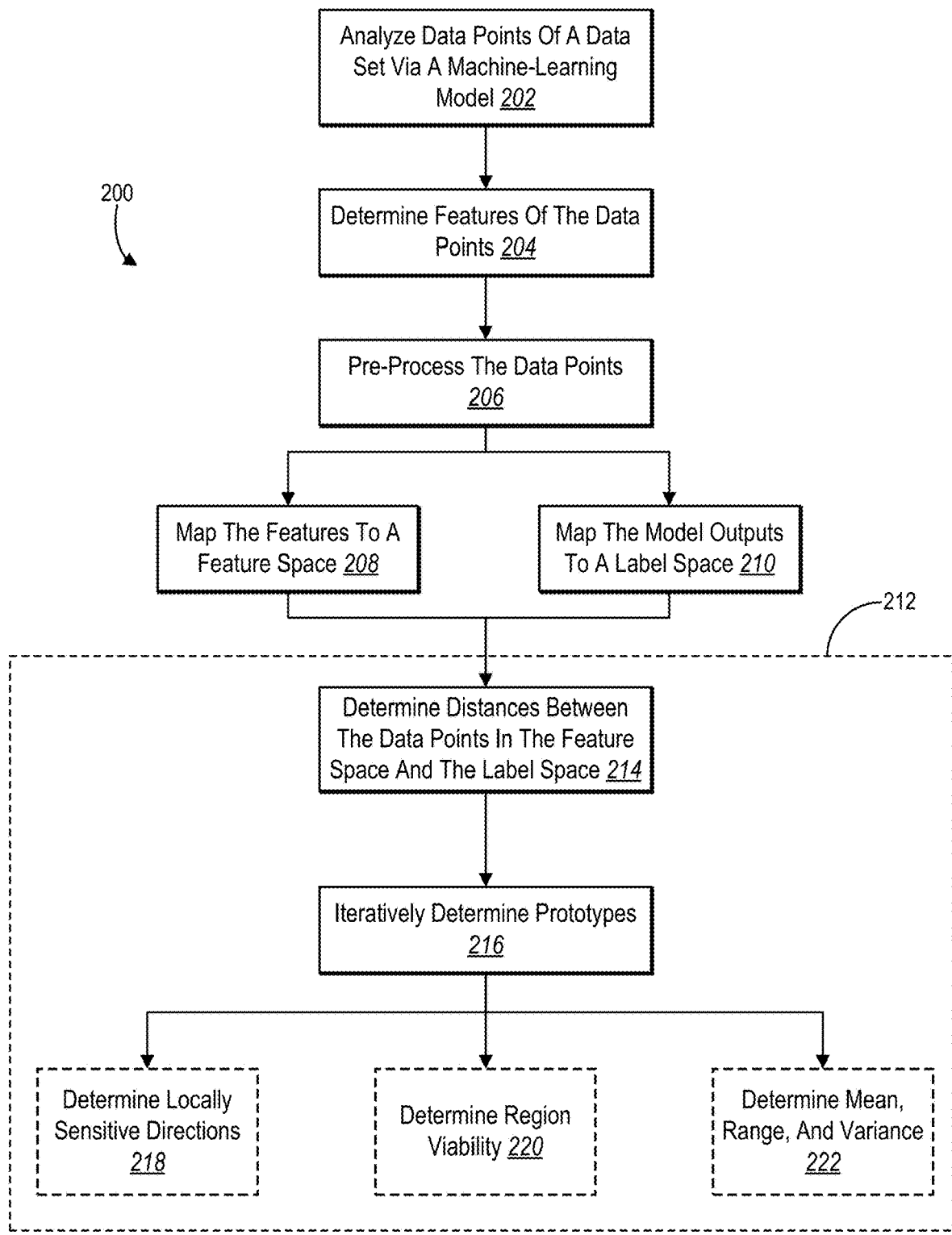
FIG. 2 illustrates a flowchart of a series of acts for prototype selection and analysis to determine feature sensitivity in accordance with one or more implementations.

As mentioned above, the model analysis system 102 can analyze inputs and outputs of a machine-learning model to determine the impact of features on the machine-learning model. FIG. 2 illustrates a diagram of a process of selecting prototypes to analyze a machine-learning model. In particular, the process includes a series of acts 200 in which the model analysis system 102 uses distance information for data points in the feature space and the label space to determine prototypes from the data points. The series of acts 200 further uses the prototypes to determine the impact of the features within the machine-learning model.

In one or more embodiments, the series of acts 200 includes an act 202 of analyzing data points of a dataset via a machine-learning model. Specifically, the model analysis system 102 obtains a dataset including a plurality of data points (e.g., from a client device or from a third-party system). The model analysis system 102 uses a machine-learning model to generate a plurality of outputs based on the data points. The machine-learning model can include one or more trained algorithms (e.g., one or more regression algorithms) that generate the outputs including predicted values for the data points based on information about the data points. In one or more alternative embodiments, the model analysis system obtains data points analyzed by a machine-learning model from a third-party system, such that the model analysis system itself does not use the machine-learning model to analyze the data points. Accordingly, the model analysis system can simply communicate with the third-party system to identify the inputs and outputs of the machine-learning model.

Once the machine-learning model has analyzed the data points, the series of acts 200 includes an act 204 of determining features of the data points. In particular, the model analysis system 102 can analyze each data point in the dataset to determine a feature set of a plurality of features that the machine-learning model uses to generate the outputs. For example, the data points in the dataset can include a feature vector with values for each feature in the feature set that are specific to the data point. To illustrate, a first data point can have a first feature, a second feature, a third feature, etc., with corresponding values for the first data point, and a second data point can also have the first feature, the second feature, the third feature, etc., with corresponding values for the second data point. Accordingly, each data point can include a feature vector with values for each feature in the feature set that are specific to the data point.

In one or more embodiments, the model analysis system 102 can extract the features of the data points by obtaining the features (e.g., input variables) from the machine-learning model. To illustrate, the model analysis system 102 can obtain the inputs from the machine-learning model and store the inputs in feature vectors corresponding to the data points. In one or more alternative embodiments, the model analysis system 102 extracts the features to input into the machine-learning model. In any case, the model analysis system 102 stores the identified features for each data points as values in a feature vector.

The series of acts 200 can then include an act 206 of pre-processing the data points based on the determined features of the data points. Specifically, pre-processing the data points can include standardizing/normalizing the dataset. For example, the model analysis system 102 modifies the data points to remove the mean from each of the features (e.g., making the features have zero-mean by subtracting the mean in the numerator). Additionally, pre-processing can include ensuring unit variance for each of the features so that a complete feature vector has length one (e.g., dividing each component of a feature vector by the standard deviation obtained coordinate-wise for the dataset with every dimension having a standard deviation). Additionally, pre-processing the data points can include the model analysis system 102 scaling the target (e.g., outputs of the machine-learning model) to have values between 0 and 1 with $y_{max}=1$ and $y_{min}=0$.

After pre-processing the data points, the series of acts 200 includes an act 208 of mapping the features to a feature space and an act 210 of mapping the model outputs to a label space. Specifically, as previously mentioned, the model analysis system 102 maps the features of each data point to an n-dimensional space including a number of dimensions equal to the number of features in the feature set (e.g., the number of values in a feature vector for each data point). The model analysis system 102 can map a feature vector to the feature space based on the values within the feature vector. For instance, for a feature set including three features, the model analysis system 102 maps a feature vector for a first data point to a point in a three-dimensional feature space based on the values in the feature vector. The model analysis system 102 thus maps each feature vector for all of the data points to a corresponding point in the three-dimensional feature space.

In addition, the model analysis system 102 maps the outputs of the machine-learning model to the label space. In particular, the model analysis system 102 identifies a value of an output for a given data point and then maps the value to a coordinate location in the label space. For example, the model analysis system 102 can map the output within a one-dimensional label space (i.e., each output in the label space has a single value).

In one or more embodiments, the series of acts 200 includes a set 212 of acts for determining an impact of the features within the machine-learning model using one or more prototypes from the data points in the dataset. Specifically, the model analysis system 102 selects prototypes that are most relevant to the model reasoning by utilizing a continuous label space to which the outputs of the machine-learning model have been mapped. For instance, the model analysis system 102 can utilize an integer linear program to analyze the data points according to a set of criteria for select prototypes. The model analysis system 102 can also modify the integer linear program to reduce the computational requirements for determining the prototypes.

For example, the series of acts 200 includes an act 214 of determining distances between the data points in the feature space and the label space. In particular, the model analysis system 102 first selects a data point to analyze within the feature space for a given epsilon ball size (E). More specifically, the model analysis system 102 identifies, for the analyzed data point, all of the data points whose features fall within the epsilon ball size, such that the model analysis system 102 identifies data points that are most similar to the analyzed data point based on the distances between data points in the feature space. To illustrate, the model analysis system 102 first calculates a distance between the analyzed data point and other data points based on the mapped feature vectors within the feature space, and then identifies the data points that fall within the epsilon ball centered on the analyzed data point.

Once the model analysis system 102 has identified data points within the epsilon ball, the model analysis system 102 determines distances between the corresponding outputs in the label space. Similar to the distances between the feature vectors in the feature space, the model analysis system 102 determines a distance between the output values of the analyzed data point and each of the data points identified within the epsilon ball. The distances between the output values in the label space depend on the features of the data points and the inner process of the machine-learning algorithm. As may be appreciated, the output values for data points with similar feature vectors can have significant differences between the output values depending on the features of the data points and the importance assigned to the features by the machine-learning model. Additional detail regarding determining the distances between data points in the feature space and the label space and selecting the prototypes based on the determined distances is provided below (e.g., in relation to FIGS. 3A-3B).

After determining the distances, the series of acts 200 includes an act 216 of iteratively determining prototypes. As mentioned previously, the model analysis system 102 determines the prototypes according to a set of criteria. In particular, the model analysis system 102 can select prototypes that 1) cover more data points with similar targets, 2) cover fewer data points with targets farther away, and 3) select the fewest number of prototypes for the epsilon ball size. For example, the model analysis system 102 can reward candidate prototypes that cover nearby data points, penalize candidate prototypes that cover data points that are not nearby in the label space, and determine a least number of prototypes that cover the data points for the epsilon ball size. By using these criteria to determine the prototypes, the model analysis system 102 reduces the processing requirements for analyzing a machine-learning model.

In one or more embodiments, to iteratively determine prototypes, the model analysis system 102 begins with an integer linear program to analyze data points within epsilon balls corresponding to each data point (i.e., each candidate prototype) in the dataset. More particularly, the model analysis system 102 (e.g., using a greedy algorithm) iteratively analyzes candidate prototypes to rank the candidate prototypes based on data points within corresponding epsilon balls of the candidate prototypes and adds candidate prototypes to a set of final prototypes by minimizing cost associated with an objective function. The model analysis system 102 can thus iteratively analyze/rank candidate prototypes and select prototypes until the model analysis system 102 determines a set of prototypes that minimizes the objective function (i.e., determines the fewest number of prototypes that cover within the feature space the nearest data points in the label space).

As described in detail below, the model analysis system 102 can utilize an optimization algorithm to determine the prototypes. For the optimization algorithm, $X \in \mathbb{R}^{n \times m}$ is a data matrix with n samples and m features. $y \in \mathbb{R}^n$ is the vector of model predictions. P refers to a set of prototypes from the dataset (X). For a set A, |A| is the cardinality of the set. Furthermore, $g(x_i)$ is the label/output of $x_i$, and $g(x_j)$ is the label/output of $x_j$. Additionally, $B(x_j)$ is the epsilon ball function. The optimization algorithm (objective function) is as follows:

$$\min_{\alpha_j, \xi_i, \eta_i} \sum_i \xi_i + \sum_i \eta_i + \lambda \sum_j \alpha_j$$

$$\sum_{j:x_i \in B(x_j)} \alpha_j (1 - |g(x_i) - g(x_j)|) \geq 1 - \xi_i \forall\, x_i \in X$$

$$\sum_{j:x_i \in B(x_j)} \alpha_j (|g(x_i) - g(x_j)|) \leq 0 + \eta_i \forall\, x_i \in X$$

$$\alpha_j \in \{0, 1\} \forall\, j$$

$$\xi_i, \eta_i \geq 0 \forall\, i$$

where $\alpha_j$, is 1 if $x_j$ is a prototype, otherwise 0. Furthermore, the first two summations in the objective function (i.e., the summations for $\xi$ and $\eta$), along with their constraints, correspond to the first two criteria—where $\xi$ and $\eta$ are positive values solved for to ensure that data points are covered (in the feature space) by prototypes closer to them (in the label space) and that data points are not covered (in the feature space) by prototypes farther away (in the label space), respectively. These two summations reinforce each other by selecting prototypes to cover (in the feature space) similar data points (in the label space) while not covering dissimilar data points. The third summation (i.e., the summation for $\alpha$) penalizes the number of prototypes, such that the model analysis system 102 selects the fewest possible number of prototypes. Additionally, $\lambda$ represents a value that the model analysis system 102 selects so as to pick a solution when there are multiple solutions with the same.

The above objective function can be rewritten as:

$$\min_{\alpha_j, \xi_i, \eta_i} \sum_i \max\left\{0, 1 - \sum_{j:x_i \in B(x_j)} \alpha_j (1 - |g(x_i) - g(x_j)|)\right\} +$$

$$\sum_i \sum_{j:x_i \in B(x_j)} \alpha_j (|g(x_i) - g(x_j)|) + \lambda \sum_j \alpha_j$$

$$\text{s.t. } \alpha_j \in \{0, 1\}$$

Because the objective function above can be computationally difficult for a large dataset, the model analysis system 102 can further use additional methods of reducing the computational requirements. For example, the model analysis system 102 can use LP relaxation, randomized rounding, or other approximation methods for solving the objective function. Additionally, the model analysis system 102 may modify the objective function above to suit constraints of the above-mentioned issue. Specifically, the model analysis system 102 can further define the objective function as:

$$\Delta Obj(x_j) = \Delta \xi(x_j) - \Delta \eta(x_j) - \lambda$$

$$\text{Set}(\xi) = B(x_j) \setminus \bigcup_{x'_j \in P} B(x'_j)$$

$$\text{Set}(\eta) = B(x_j)$$

where $$\Delta \xi(x_j) = \sum_{x_i \in \text{Set}(\xi)} (1 - |g(x_i) - g(x_j)|)$$

$$\Delta \eta(x_j) = \sum_{x_i \in \text{Set}(\eta)} (|g(x_i) - g(x_j)|)$$

in which $\Delta \xi$ and $\Delta \eta$ correspond to the values solved for in the objective function to ensure data points are covered (in the feature space) by prototypes closer to them (in the label space) and that data points are not covered (in the feature space) by prototypes farther away (in the label space), respectively, according to the above equations.

To determine the set of prototypes (P), the model analysis system 102 can perform the following algorithm:
start with $P = \phi$
while ($\Delta Obj(x^*) > 0$)
  Find $(x^*) = \text{argmax}_{x_j} \Delta Obj(x_j)$
  $P \leftarrow P \cup \{x^*\}$ This modified algorithm allows the model analysis system 102 to efficiently identify a solution to the objective function. Specifically, the model analysis system 102 can add and/or subtract candidate prototypes until determining a set of prototypes that minimize the overall cost.

As mentioned above, in one or more embodiments, the model analysis system 102 can select a threshold size (e.g., an epsilon ball size). For example, in one or more embodiments, the model analysis system 102 can select the epsilon ball size using cross-validation. In particular, the model analysis system 102 can optimize for the mean squared error with k nearest prototypes.

Additionally, for multiclass classifiers, the machine-learning model can return a probability vector. In such cases, the model analysis system 102 can thus use a Euclidean distance $\|g(x_i) - g(x_j)\|_2$ or other statistical distance metrics $d(g(x_i), g(x_j))$ such as Jensen-Shannon distance, Bhattacharya distance, etc. The model analysis system 102 can thus account for probability vectors for multiclass classifiers when determining prototypes. Accordingly, the model analysis system 102 can flexibly determine prototypes for analyzing a variety of machine-learning models.

Once the model analysis system 102 has determined the prototypes from the data points, the model analysis system 102 uses the prototypes to determine the impact of the features within the machine-learning model. In particular, the model analysis system 102 can use one or more algorithms or methods of analyzing the prototypes to determine the impact of the features from the feature set within the machine-learning model. For example, the series of acts 200 can include an act 218 of determining locally sensitive directions, an act 220 of determining region variability, and/or an act 222 of determining mean, range, and variance.

As mentioned, the model analysis system 102 can determine (at the act 218) locally sensitive directions based on the prototypes. Specifically, the model analysis system 102 can approximate a gradient using the prototypes to provide interpretable meaning to the selected prototypes. In one or more embodiments, the model analysis system 102 determines a distribution of prototypes and then analyze the impact of the features of the corresponding prototypes based on the positions of the prototypes within the label space. Further, the model analysis system 102 can analyze each individual variable in the gradient to rank order directions (e.g., features of the prototypes) by sensitivity (e.g., based on the impact of the features on the outputs of the machine-learning model).

For example, the model analysis system 102 can determine, for a given test point $\{x_i, y_i\}$, the nearest prototype $x_l$ with $y_l < y_i$ (i.e., the closest prototype lower than the test point) and the nearest prototype $x_u$ with $y_u > y_i$ (i.e., the closest prototype higher than the test point). This can be viewed as similar to setting a classification decision boundary at $g(x) = y_i$, where $g(x)$ is the model prediction function $g: x \in \mathbb{R}^m \rightarrow g(x) \in \mathbb{R}$. Assuming that the gradient lies along $x_u - x_l$, the model analysis system can use $$\hat{\nabla} g(x_i) = \frac{(y_u - y_l)}{\|x_u - x_l\|_2^2}(x_u - x_l)$$

which is a pseudo gradient and satisfies $\hat{\nabla}g(x_i)^T(x_u - x_l) = y_u - y_l$. In one or more embodiments, the model analysis system 102 alternatively contrasts the relative directions from the test point to make the pseudo gradient more precise as $$\hat{\nabla} g(x_i) = \frac{1}{2}\left(\frac{(y_u - y_i)}{\|x_u - x_i\|_2^2}(x_u - x_i) + \frac{(y_l - y_i)}{\|x_l - x_i\|_2^2}(x_l - x_i)\right)$$

Alternatively, the model analysis system 102 can determine the k nearest neighbors of the chosen test point and look at the mean gradients of the outputs of the k nearest neighbors to determine the impact of the features within the machine-learning model.

Additionally, as previously mentioned, the model analysis system 102 can determine (at the act 220) region variability based on the determined prototypes. Specifically, the model analysis system 102 can compare the variability of regions in either the feature space or the label space based on the distribution of prototypes. For instance, the model analysis system 102 can determine the impact of a certain range of feature vectors in a first region within the machine-learning model as compared to the range of feature vectors in a second region by comparing the number of prototypes in each region. More particularly, if the first region has more prototypes than the second region, the model analysis system 102 can determine that the first region has a higher variability than the second region.

In addition, the number of prototypes in a region also indicates a complexity of the machine-learning model. A higher number of prototypes for a region is indicative of a machine-learning model with more complex and/or distant boundaries. In particular, a complex model has more prototypes because the prototypes are covering data points that are similar within the label space, so a higher number of prototypes indicates a higher number of groups of data points that are similar to each other while also being dissimilar from data points in other groups. Likewise, a lower number of prototypes for a region is indicative of a machine-learning model with less complex boundaries. As an example, a region that has three prototypes is less complex than a region that has ten prototypes because the model analysis system 102 determines that all of the data points within the region can be represented by only three prototypes due to the data points being clustered into a few large groups, rather than many small groups.

As further mentioned above, the model analysis system 102 can determine (at the act 222) mean, range, and variance in connection with the prototypes (e.g., calculated based on the outputs associated with the prototypes) to provide interpretability of the machine-learning model. Specifically, the model analysis system 102 selects a test point and then determines the mean, range, and variance of the outputs corresponding to prototypes in the neighborhood of the test point. To illustrate, the model analysis system 102 can analyze the outputs of the k nearest neighbor prototypes to calculate the mean, range, and variance of the k nearest neighbor prototypes to estimate the prediction process of the machine-learning model. For example, the model analysis system 102 can average the k nearest neighbors to estimate a model prediction by computing the mean ($\mu$) and variance ($\sigma^2$) of the outputs of the k nearest neighbor prototypes.

In one or more alternative embodiments, the model analysis system 102 determines mean, variance, and range based on features of the prototypes. In particular, the model analysis system 102 can identify the nearest prototypes for a test point in the label space and then calculate the mean, variance, and range of feature values and/or feature vectors of the prototypes for comparing to feature values/feature vectors of the test point. Thus, the model analysis system 102 can determine how similar a given test point is to other data points that are similarly treated by the machine-learning model.

As an example, for a dataset including housing units, the model analysis system 102 can select a test point (e.g., a given housing unit). The model analysis system 102 can then select the two nearest neighbor housing units in the label space (e.g., housing units above and below the selected test point for which the machine-learning model has generated the closest output values). For instance, if the machine-learning model generates a predicted price for each housing unit, the model analysis system 102 can select, for a housing unit, two units with the closest predicted prices. The model analysis system can then analyze the features of the two units (e.g., number of bedrooms, square footage) to determine the mean, range, and/or variance of those features.

In one or more embodiments, a high bias value (computed as $|g(x_i) - \mu|$) or variance implies that the machine-learning model behaves unusually for the test point. In other words, the machine-learning model behavior for such points is not similar to that for prototypical examples from the dataset, which can be a consequence of the input distribution, noise, or richness of the model, in addition to other possible irregularities. As determined, the mean squared bias, or mean squared error, is the optimization for a cross validation process used to select epsilon (for the epsilon ball size). In general, models for which the prototypes fit well with a low mean squared error have a high interpretability. The model analysis system 102 can determine, from a plurality of available machine-learning models, which machine-learning model to deploy after taking into consideration the mean squared error achieved by each machine-learning model and the interpretability of the model determined based on the selected prototypes.

Figure 3B:
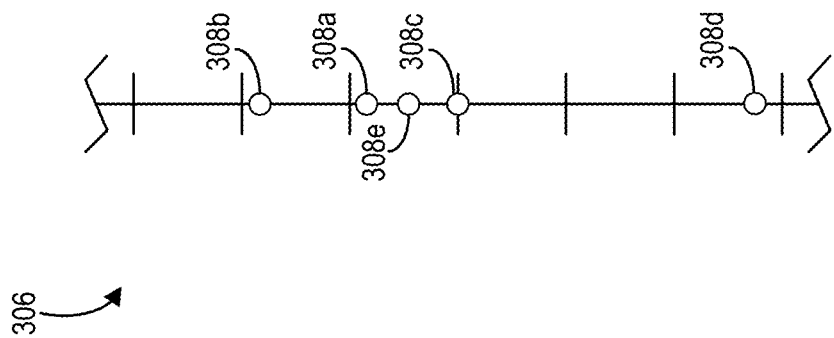
Figure 3A:
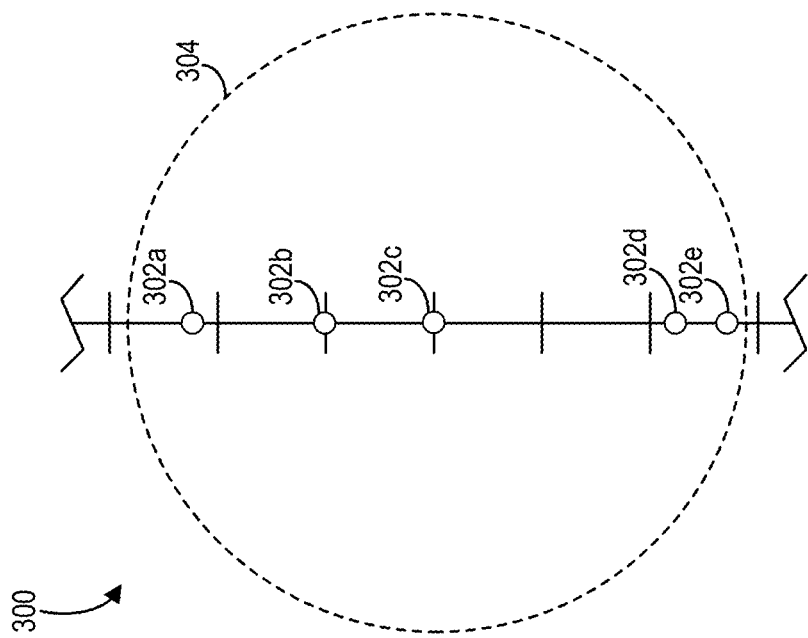

As described in relation to FIG. 2 and in the corresponding FIGS. 3A-3B, the model analysis system 102 can perform operations for using prototypes from a dataset to analyze the impact of data point features within a machine-learning model. The operations allow the model analysis system 102 to analyze any machine-learning model using the inputs and outputs of the machine-learning model and without having information about the internal process of the machine-learning model. Accordingly, the acts and operations illustrated and described above in relation to FIG. 2 (e.g., the set 212 of acts) and below in relation to FIGS. 3A-3B can provide the corresponding structure for an example step for determining an impact of the features within the machine-learning model using one or more prototypes from the plurality of data points.

FIG. 3A illustrates a feature space 300 including a plurality of mapped feature values for a plurality of data points in a dataset. As illustrated, the feature space 300 is a one-dimensional feature space for mapping the data points according to corresponding values of a feature of the data points. Specifically, each of the data points in the dataset have a value for a single feature that is common among all of the data points. While the feature space 300 of FIG. 3A is a one-dimensional feature space, the model analysis system 102 is able to map n features of data points to an n-dimensional feature space.

As shown, the model analysis system 102 maps each of a plurality of data points (that include a subset of data points 302a-302e) to the feature space 300. In particular, the model analysis system 102 determines a value of a feature for each of the data points 302a-302e and then maps the values to the feature space 300. The feature space 300 includes a single axis onto which the model analysis system 102 plots the feature values corresponding to the data points 302a-302e. Accordingly, the model analysis system 102 plots a first data point 302a on the axis within the feature space 300 based on a value of the feature for the first data point 302a, a second data point 302b on the axis based on a value of the feature for the second data point 302b, and so on for a third data point 302c, a fourth data point 302d, a fifth data point 302e, etc.

Once the model analysis system 102 has mapped all of the data points into the feature space, the model analysis system 102 then analyzes, for a data point, all of the data points within an epsilon ball to determine prototypes representing the data points within the epsilon ball. For instance, as illustrated in FIG. 3A, the model analysis system 102 analyzes data points within an epsilon ball 304 relative to the third data point 302c. Specifically, the epsilon ball 304 covers data points within a given distance from the third data point 302c based on a selected size of the epsilon ball 304. As mentioned, the model analysis system 102 can determine the distances between data points such as by determining the absolute value of the Euclidean distance between a given data point and the third data point 302c. After determining that the data points 302a, 302b, 302d, 302e are within a distance of the third data point 302c that falls within the epsilon ball 304, the model analysis system 102 identifies the subset of data points 302a-302e as being inside the epsilon ball 304.

In one or more embodiments, after identifying the subset of data points within the epsilon ball 304, the model analysis system 102 performs operations for determining prototypes based on distances between the identified data points in a label space. In particular, the model analysis system 102 can analyze prototypes and candidate prototypes to add (or delete) from a set of prototypes. Specifically, the model analysis system 102 can analyze prototypes and candidate prototypes that fall within the epsilon ball by determining distances in the label space between the prototypes and candidate prototypes and any particular data point.

For example, FIG. 3B illustrates a label space 306 to which the model analysis system 102 maps outputs of the machine-learning model. More particularly, the model analysis system 102 plots output values of data points in the dataset to a coordinate axis of the label space 306. Accordingly, the model analysis system 102 maps an output value for each of the data points 302a-302e (i.e., output values 308a-308e, respectively) to the label space 306 at the corresponding coordinates of the label space 306.

Once the output values 308a-308e are mapped to the label space 306, the model analysis system 102 uses distances between the output values 308a-308e to determine whether to add a candidate prototype to a set of prototypes using an iterative process. For instance, the model analysis system 102 can identify a candidate prototype (e.g., data point 302c) from the set of data points 302a-302e to analyze according to the selected epsilon ball 304. The model analysis system 102 can then determine whether to select the candidate prototype as a prototype to use in determining the impact of the features within the machine-learning model (e.g., select prototypes that minimize overall cost).

According to one or more embodiments, the model analysis system 102 uses an integer linear program to analyze the data points. The integer linear program, as previously described, includes an objective function that the model analysis system 102 minimizes to find prototypes that satisfy a set of criteria. In particular, the integer linear function can verify that the prototypes cover data points (in the feature space) with similar targets (e.g., similar output values in the label space), that the prototypes do not cover data points (in the feature space) with targets farther away (e.g., dissimilar output values in the label space), and that the system 102 determines as few prototypes as possible for the epsilon ball size (across all data points).

When analyzing the data points in a dataset using the integer linear program, the model analysis system 102 can analyze each data point as a candidate prototype. More specifically, the model analysis system 102 can analyze the viability of each candidate prototype (e.g., the third data point 302c in FIG. 3A), given the constraints, and select one or more of the data points as a prototype. For example, under these constraints, the model analysis system 102 can select prototypes that represent other data points with similar outcomes from the machine-learning model.

Specifically, the model analysis system 102 can select a candidate prototype that minimizes an overall cost from the object function (as described above). For instance, the model analysis system 102 can determine that the data points 302a, 302b, 302d, 302e within the epsilon ball 304 of the data point 302c in the feature space and that the output values 308a, 308b, 308d, 308e are also close to the output value 308c (corresponding to the data point 302c) within the label space 306. Accordingly, in one or more embodiments, the model analysis system 102 selects the third data point 302c as a prototype as being representative of the other data points within the epsilon ball 304. Alternatively, the model analysis system 102 can determine that the cost of adding the third data point 302c as a prototype is too high based on the distances between the output values within the label space 306 and then analyze one or more other data points (and corresponding epsilon balls) as candidate prototypes, as illustrated in FIGS. 3C-3D.

Although FIGS. 3A-3B only illustrate analyzing the third data point 302c as a candidate point using an epsilon ball centered on the third data point 302c, the model analysis system 102 can determine a cost of a set of prototypes across all data points in the dataset. For example, in addition to analyzing the third data point 302c as a candidate prototype, the model analysis system 102 can determine the cost of adding an additional candidate prototype to a set of prototypes by analyzing an epsilon ball around the additional candidate prototype.

To illustrate, FIG. 3C illustrates that the model analysis system 102 analyzes the fourth data point 302d as a candidate prototype with an epsilon ball 310 centered on the fourth data point 302d. Specifically, the epsilon ball 310 covers data points within a given distance from the fourth data point 302d based on the selected size of the epsilon ball 310, which has the same size as the epsilon ball 304 used for the third data point 302c. The model analysis system 102 determines the distances between each data point and the fourth data point 302d within the epsilon ball 310. After determining that the data points 302c, 302e, 302f, and 302g are within a distance of the fourth data point 302d that falls within the epsilon ball 310, the model analysis system 102 identifies the subset of data points 302c-302g as being inside the epsilon ball 310.

In one or more embodiments, after identifying the subset of data points within the epsilon ball 310, the model analysis system 102 performs operations for determining whether the fourth data point 302d is a prototype based on distances between the identified data points in the label space 306. In particular, the model analysis system 102 can analyze the cost of adding the fourth data point 302d as a prototype to the set of prototypes. For example, the model analysis system 102 can analyze whether adding the fourth data point 302d to the set of prototypes, in connection with previously added prototypes, increases or decreases the overall cost of the objective function.

FIG. 3D illustrates outputs of the machine-learning model for the subset of data points 302c-302g mapped to the label space 306. As illustrated, the mapped output values for the data points 302c-302g (i.e., output values 308c-308g, respectively) include output values (308c, 308d, 308e) that also correspond to one or more other epsilon balls (e.g., epsilon ball 304). The model analysis system 102 uses distances between the output values 308c, 308e, 308f, 308g to determine the overall cost of adding the fourth data point 302d to the set of prototypes.

As mentioned above, the model analysis system 102 can determine, based on the distances between the output values 308c-308g, the overall cost of adding the candidate prototype to the set of prototypes. Specifically, the model analysis system 102 can determine the cost of adding a candidate prototype to the set of prototypes. To illustrate, the model analysis system 102 can determine that the third data point 302c is a representative prototype for the other data points within the epsilon ball 304 based on the distances between the third data point 302c and the other data points in the label space. Alternatively, the model analysis system 102 may determine that the third data point 302c is not representative of other data points within the epsilon ball 304 based on the determined distances such that the model analysis system 102 does not select the third data point 302c as a prototype.

Furthermore, because the prototype selection process is iterative, the model analysis system 102 can use a ranking system for ranking candidate prototypes based on the impact to the overall cost from the objective function. For example, while analyzing the candidate prototypes in the dataset, the model analysis system 102 can rank each candidate prototype based on the impact to the overall cost. In particular, the model analysis system 102 can rank data points that have not previously been selected as a prototype as candidate prototypes and select the highest ranked candidate (e.g., the candidate that adds the lowest cost based on the objective function). As an example, the model analysis system 102 can determine that the cost for having the fourth data point 302d in the set of prototypes is lower than having the third data point 302c in the set of prototypes (e.g., based on the distances/coverage of the data points in the respective epsilon balls) and can select the fourth data point 302d as a prototype over the third data point 302c. The model analysis system 102 can then re-rank the remaining data points and select another prototype. The model analysis system 102 can thus repeatedly rank and select prototypes (e.g., until the cost no longer decreases). Furthermore, when selecting a data point as a prototype, the model analysis system can also exclude other data points within the epsilon ball of the selected prototype to reduce the processing time required to select prototypes.

In at least some instances, the model analysis system 102 also removes prototypes from the set of prototypes based on adding other prototypes to the set of prototypes. Specifically, adding a first prototype can result in a greater cost when combined with a second prototype than when combined with a third prototype. Accordingly, the model analysis system 102 can modify the set of prototypes to exclude the second prototype and include the third prototype when adding the first prototype to the set of prototypes. The model analysis system 102 can thus iteratively adjust the set of prototypes to select the best group of prototypes the minimize the overall cost for the dataset.

FIGS. 3A-3D illustrate a simplified version of the operations for determining prototypes. Specifically, while FIGS. 3A-3D show a process for analyzing only a few data points for determining prototypes, the model analysis system 102 is able to analyze many data points in a dataset. For instance, datasets often include millions or billions of data points. Accordingly, the model analysis system 102 can use the iterative prototype selection process, or a modified version as previously described, to reduce the amount of data the system 102 analyzes to determine the impact of the features within the machine-learning model. Furthermore, limiting the prototype selection using an epsilon ball corresponding to a candidate prototype, rather than analyzing each data point within a dataset as a candidate prototype, further reduces the processing requirements for selecting prototypes.

Furthermore, data points often include a number of features, rather than a single feature as shown in FIGS. 3A-3D. For instance, the model analysis system 102 can determine prototypes based on an n-dimensional feature space. In such cases, the epsilon ball size corresponds to a sphere of radius E that finds data points with n-dimensional feature vectors mapped within the feature space. For instance, if the data points each have a set of ten features, the model analysis system 102 maps the feature vectors of the data points to a ten-dimensional feature space and then determines the prototypes from data points within the epsilon ball size.

Once the model analysis system 102 has determined any prototypes from the subset of data points 302a-302e and the subset of data points 302c-302g, the model analysis system 102 can use the prototype(s) to analyze the impact of features within the machine-learning model. For example, as previously described, the model analysis system 102 can analyze the prototypes using one or more algorithms that use distance information associated with the prototypes to determine the impact of the features. Specifically, the model analysis system 102 can determine that one or more of the features of the set of features impacts the output values more than other features.

Figure 4A:
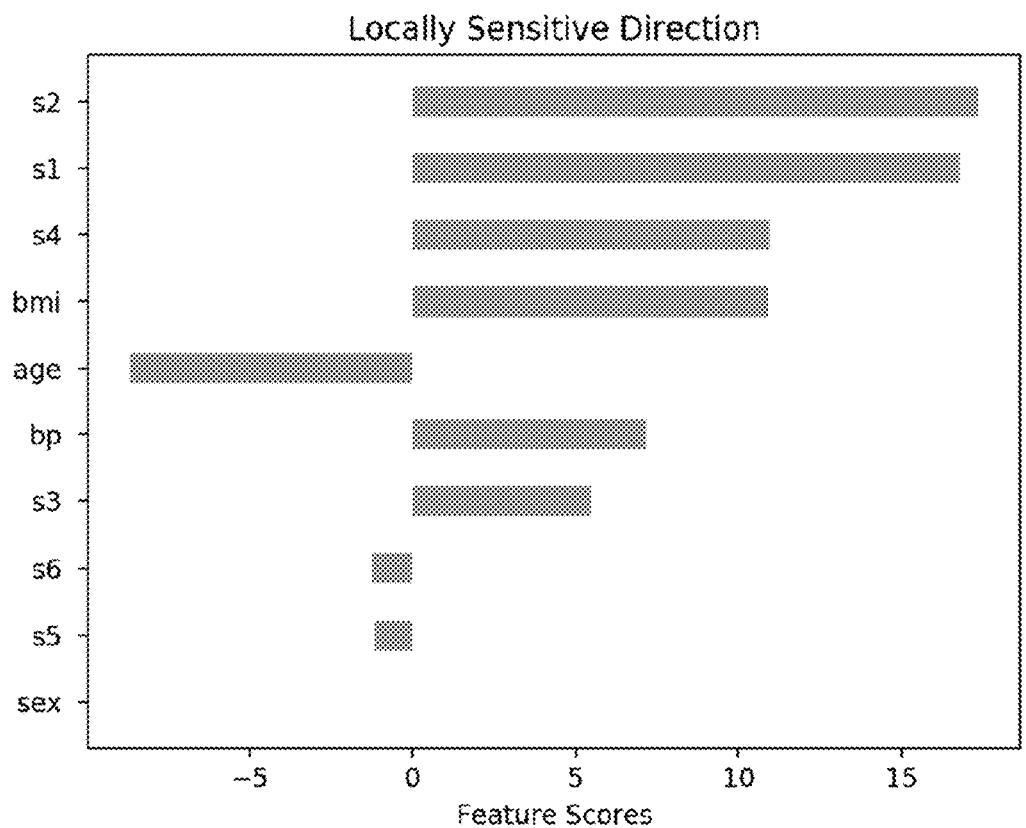
FIGS. 4A-4B illustrate graph diagrams of an embodiment of prototype analysis data for a machine-learning model in accordance with one or more implementations.
Figure 4B:
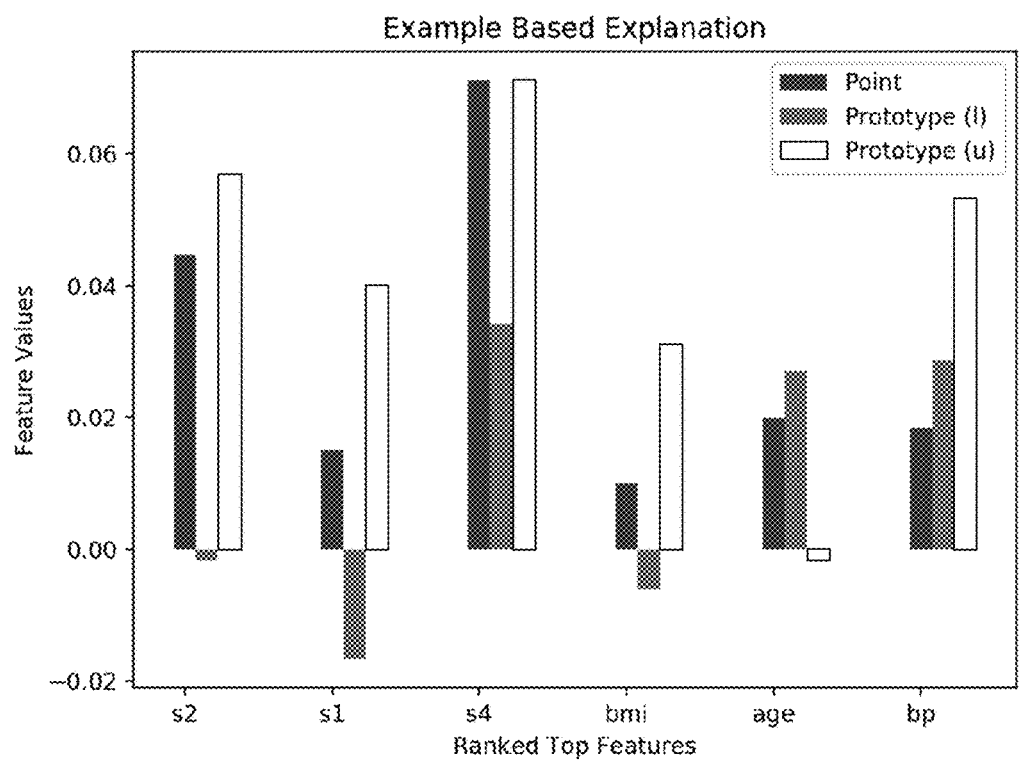
Figure 5:
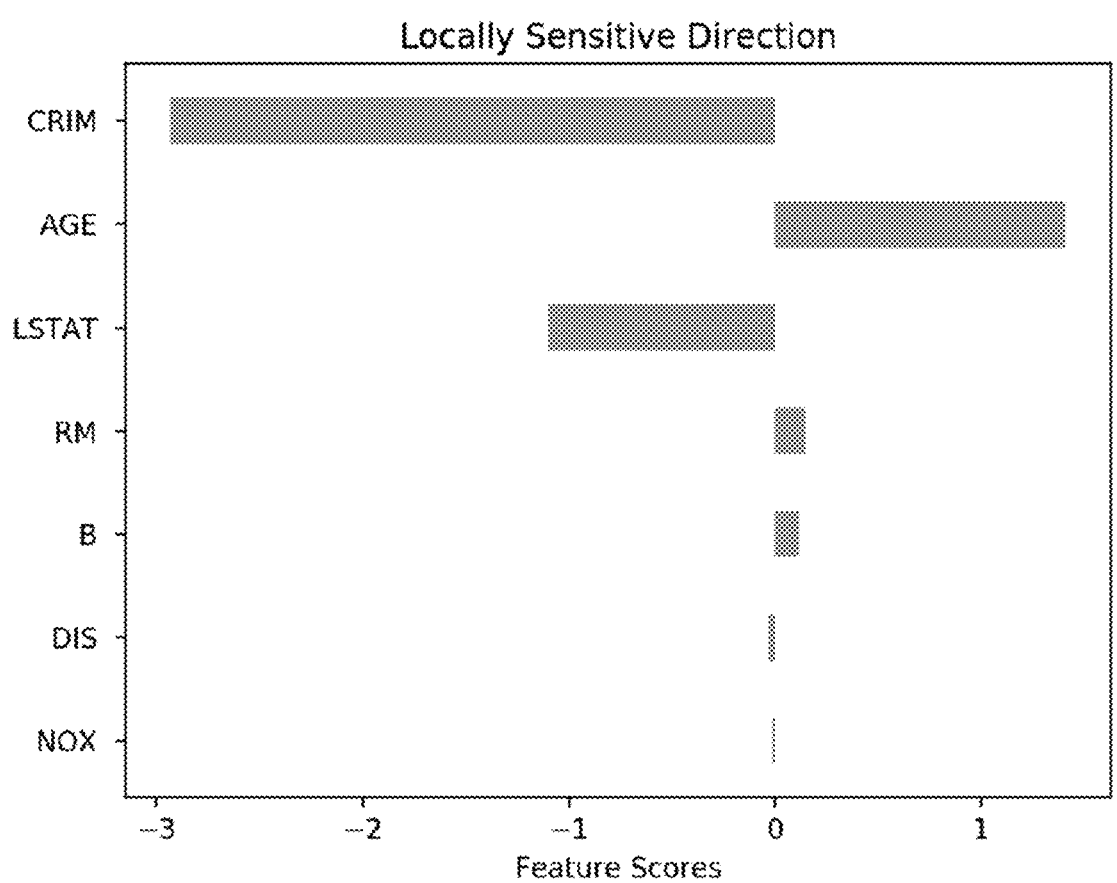
FIG. 5 illustrates a graph diagram of another embodiment of prototype analysis data for a machine-learning model in accordance with one or more implementations.

FIGS. 4A-4B and FIG. 5 illustrate graph diagrams including analysis data using prototypes for example embodiments. In particular, FIGS. 4A-4B illustrate graph diagrams for an embodiment based on a training dataset including health information for patients in a diabetes study for a machine-learning model. FIG. 5 illustrates a graph diagram for an embodiment based on a training dataset including housing data/prices for housing units in a given region for a machine-learning model.

FIG. 4A illustrates a graph indicating feature scores based on a locally sensitive direction/gradient algorithm analysis of the diabetes dataset. Specifically, the dataset includes a set of features about the patients including age, sex, body mass index, blood pressure, and a plurality of blood serum measurements. The target is a quantitative measure of disease progression one year after baseline. The model analysis system 102 (e.g., using the machine-learning model 112) utilized the training dataset to train a neural network with two hidden layers with sixteen and eight nodes, respectively, on the dataset and then used the iterative prototype selection and analysis process described herein to provide explanations for the operation of the neural network. For a given test point, the graphs show local direction of sensitivity, which further operate as a pseudo gradient for approximating change of target given perturbation in the feature space.

FIG. 4B illustrates a graph including a comparison of nearest neighbor prototypes to test points in the diabetes dataset. In one or more embodiments, the test point is also a prototype. In particular, FIG. 4B uses the nearest neighbors to define the local sensitivity for a given point based on the proximity of the nearest prototypes. As shown, the model analysis system 102 can utilize the difference in feature values to determine the relationship between the feature and the impact on the outputs of the machine-learning model based on the difference and direction of the values of the test point and the nearest prototypes. Using both graphs (of FIG. 4A and FIG. 4B) together, the model analysis system 102 (or a requesting user) can determine the features that have the most impact, and how they impact, the outputs of the machine-learning model. For instance, based on the analysis data in FIG. 4A, the model analysis system 102 can determine that sex has almost no impact on the outputs of the machine-learning model while age has a significant negative impact and blood measurements and BMI (body mass index) have significant positive impacts relative to the output values of the test data point and the nearby prototypes. Additionally, from the analysis data in FIG. 4B, the model analysis system 102 can determine that the output values for the closest prototypes in the feature space change drastically for certain features (e.g., the features are volatile) relative to the test data point.

FIG. 5 illustrates a graph indicating feature scores based on a locally sensitive direction/gradient algorithm analysis of the housing prices dataset. Specifically, the training dataset includes data with a set of thirteen features such as crime rate, distance to commercial centers, nitric oxide concentration, etc. The target is a median value of owner-occupied homes. The model analysis system 102 (e.g., using the machine-learning model 112) utilized the training dataset to train a neural network and then used the iterative prototype selection and analysis process to provide explanations, as in the diabetes dataset. As shown, the crime in a given area had a large negative correlation with the price.

Figure 6:
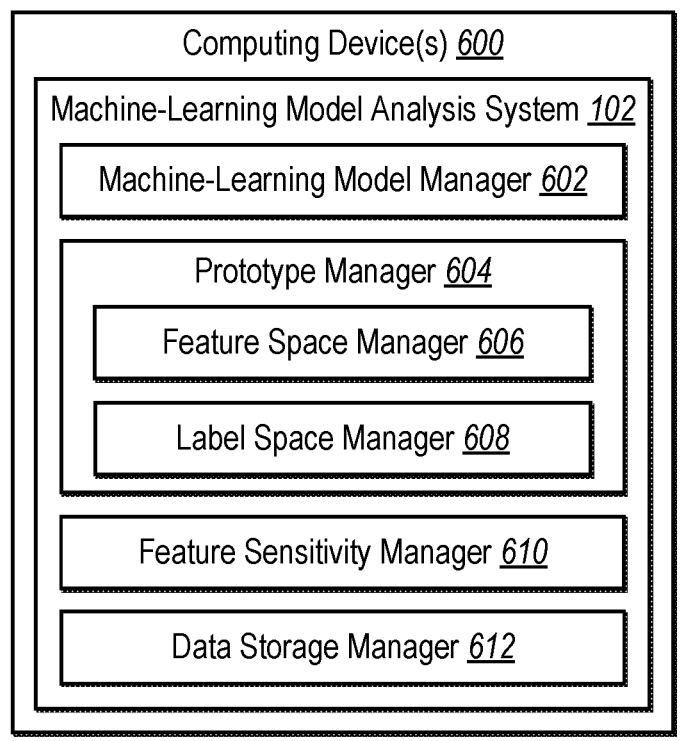
FIG. 6 illustrates a diagram of the machine-learning model analysis system of FIG. 1 in accordance with one or more implementations.

As described in relation to FIGS. 1-5, the model analysis system 102 can thus perform operations for determining the inner workings of a black box machine-learning model. FIG. 6 illustrates a detailed schematic diagram of an embodiment of the machine-learning model analysis system 102 described above. As shown, the model analysis system 102 can be implemented on computing device(s) 600 (e.g., a client device and/or server device as described in relation to FIG. 1, and as further described below in relation to FIG. 8). Additionally, the model analysis system 102 can include, but is not limited to, a machine-learning model manager 602, a prototype manager 604 that includes a feature space manager 606 and a label space manager 608, a feature sensitivity manager 610, and a data storage manager 612. The model analysis system 102 can be implemented on any number of computing devices. For example, the model analysis system 102 can be implemented in a distributed system of server devices for analyzing a machine-learning model using prototypes. Alternatively, the model analysis system 102 can be implemented on a single computing device such as a single client device running a client application that generates prototypes for analyzing the impact of data features within a machine-learning model.

In one or more embodiments, each of the components of the model analysis system 102 is in communication with other components using any suitable communication technologies. Additionally, the components of the model analysis system 102 can be in communication with one or more other devices including other computing devices of a user, server devices (e.g., cloud storage devices), licensing servers, or other devices/systems. It will be recognized that although the components of the model analysis system 102 are shown to be separate in FIG. 6, any of the subcomponents may be combined into fewer components, such as into a single component, or divided into more components as may serve a particular implementation. Furthermore, although the components of FIG. 6 are described in connection with the model analysis system 102, at least some of the components for performing operations in conjunction with the model analysis system 102 described herein may be implemented on other devices within the environment.

The components of the model analysis system 102 can include software, hardware, or both. For example, the components of the model analysis system 102 can include one or more instructions stored on a computer-readable storage medium and executable by processors of one or more computing devices (e.g., the computing device(s) 600). When executed by the one or more processors, the computer-executable instructions of the model analysis system 102 can cause the computing device(s) 600 to perform the machine-learning model analysis operations described herein. Alternatively, the components of the model analysis system 102 can include hardware, such as a special purpose processing device to perform a certain function or group of functions. Additionally, or alternatively, the components of the model analysis system 102 can include a combination of computer-executable instructions and hardware.

Furthermore, the components of the model analysis system 102 performing the functions described herein with respect to the model analysis system 102 may, for example, be implemented as part of a stand-alone application, as a module of an application, as a plug-in for applications, as a library function or functions that may be called by other applications, and/or as a cloud-computing model. Thus, the components of the model analysis system 102 may be implemented as part of a stand-alone application on a personal computing device or a mobile device. Alternatively, or additionally, the components of the model analysis system 102 may be implemented in any application that allows machine-learning model analysis or that utilize machine-learning, including, but not limited to ADOBE® CREATIVE CLOUD®, ADOBE® MARKETING CLOUD®, and ADOBE® EXPERIENCE CLOUD® software. "ADOBE," "ADOBE CREATIVE CLOUD," "ADOBE MARKETING CLOUD," and "ADOBE EXPERIENCE CLOUD," are registered trademarks of Adobe Inc. in the United States and/or other countries.

As mentioned, the model analysis system 102 includes a machine-learning model manager 602 that facilitates the management of one or more machine-learning models. In particular, the machine-learning model manager 602 can identify machine-learning models for the model analysis system 102 to analyze. The machine-learning model manager 602 can further perform operations for obtaining data associated with the machine-learning models, including inputs and outputs. In one or more embodiments, the machine-learning model manager 602 communicates with the data storage manager 612 to store temporary or permanent data associated with the machine-learning models, including analysis data from one or more other components of the model analysis system 102.

Additionally, the model analysis system 102 includes a prototype manager 604 that determines prototypes for a dataset based on inputs and outputs of a machine-learning model. Specifically, the prototype manager 604 includes a feature space manager 606 to facilitate the mapping and management of features input to machine-learning models to feature spaces. More specifically, the feature space manager 606 obtains feature values for features of data points that a machine-learning model analyzes. The feature space manager 606 then maps the feature values to an n-dimensional feature space, where n is the number of feature values in the feature set (i.e., in each feature vector for each data point).

Additionally, the prototype manager 604 includes a label space manager 608 to facilitate the mapping and management of outputs of machine-learning models to label spaces. In particular, the label space manager 608 obtains outputs of a machine-learning model that the machine-learning model generates based on the features for the data points. The label space manager 608 can then map the outputs of the machine-learning model to a label space. Furthermore, the label space manager 608 can communicate with the feature space manager 606 to maintain mappings between the features and the output(s) for each data point.

Using the mappings from the feature space manager 606 and the label space manager 608, the prototype manager 604 determines prototypes from the dataset. In particular, the prototype manager 604 can iteratively analyze data points within an epsilon ball centered at a given data point to determine candidate prototypes. The prototype manager 604 can then analyze the viability of each candidate prototype based on distance information relative to other data points and further based on a number of prototypes selected. The prototype manager 604 can thus determine a plurality of prototypes from the dataset for determining the impact of features within the machine-learning model.

Once the prototype manager 604 has determined prototypes, the feature sensitivity manager 610 facilitates the analysis of the internal processes of a machine-learning model. Specifically, the feature sensitivity manager 610 communicates with the prototype manager 604 to obtain prototypes representing the dataset. The feature sensitivity manager 610 then analyzes the prototypes using one or more algorithms to determine an impact of the features of the dataset within the machine-learning model. In at least some embodiments, the feature sensitivity manager 610 also generates a report including analysis of the machine-learning model to provide to a client device of a user.

The model analysis system 102 also includes a data storage manager 612 (that comprises a non-transitory computer memory) that stores and maintains data associated with analyzing a black box machine-learning model. For example, the data storage manager 612 can store a dataset (e.g., a plurality of data points) and data associated with the machine-learning model (e.g., input data and output data). The data storage manager 612 can also store information associated with analyzing the machine-learning model such as selected prototypes, outputs of algorithms analyzing the impact of features within the machine-learning model, and report data sent to a client device of a user.

Figure 7:
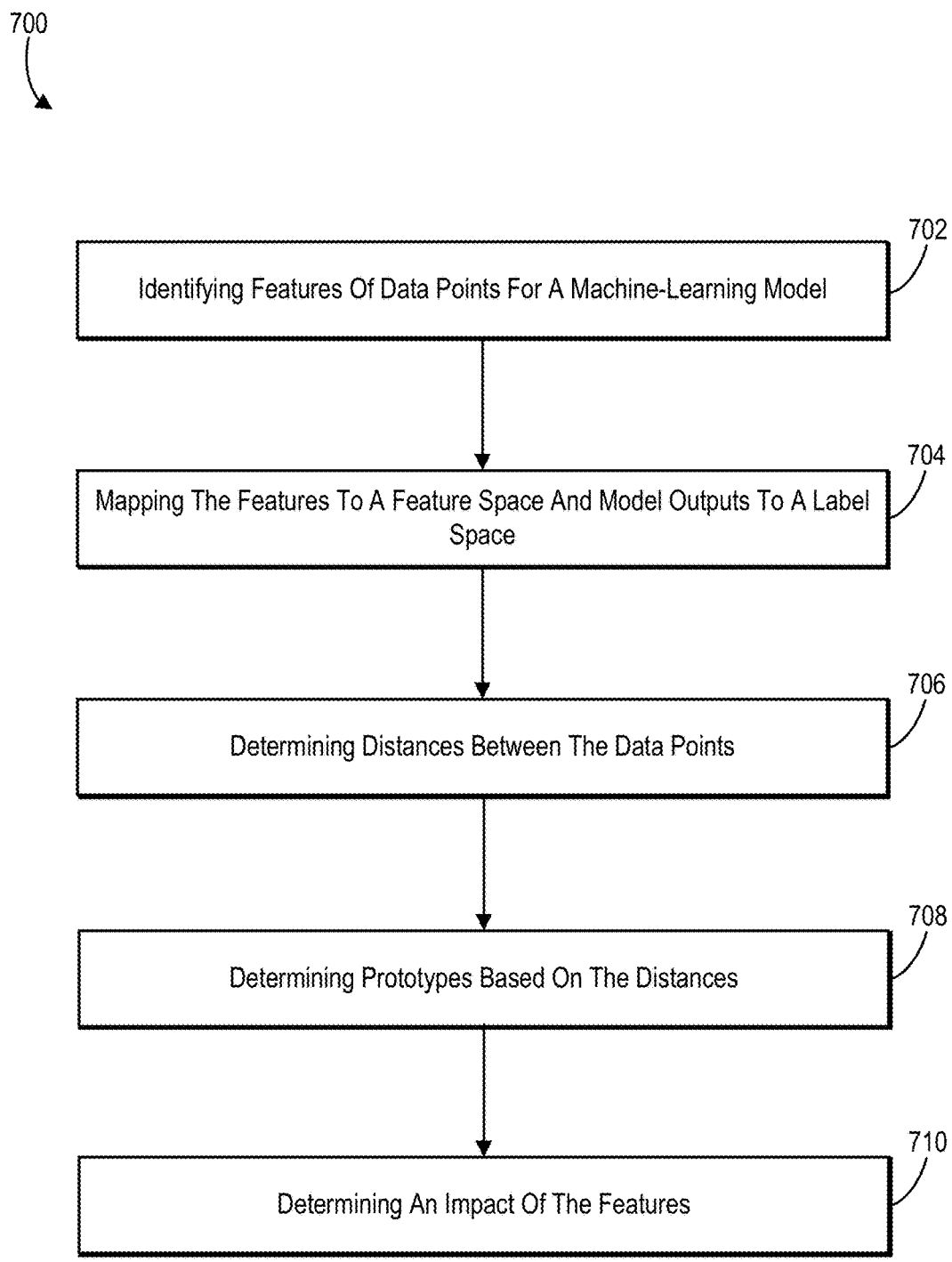
FIG. 7 illustrates a flowchart of a series of acts for prototype selection and analysis to determine machine-learning feature sensitivity in accordance with one or more implementations.

Turning now to FIG. 7, this figure shows a flowchart of a series of acts 700 of prototype selection and analysis to determine feature sensitivity within a machine-learning model. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

As shown, the series of acts 700 includes an act 702 of identifying a plurality of data points for a machine-learning model. For example, act 702 involves identifying features of a plurality of data points used to generate a plurality of outputs via a machine-learning model. Act 702 can involve identifying, for each data point of the plurality of data points, a feature vector comprising feature values for a plurality of features. Additionally, act 702 can involve identifying for each data point of the plurality of data points, at least one output value generated by the machine-learning model based on a corresponding feature vector. Act 702 can also involve identifying a plurality of output values for a data point based on a corresponding feature vector.

The series of acts 700 also includes an act 704 of mapping the features to a feature space and model outputs to a label space. For example, act 704 involves mapping the features of the plurality of data points to a feature space and the plurality of outputs to a label space. Act 704 can involve plotting feature values from feature vectors for the plurality of data points into the feature space, wherein the feature space comprises n dimensions. Additionally, act 704 can involve plotting output values from the plurality of outputs into the label space.

Additionally, the series of acts 700 includes an act 706 of determining distances between the data points. For example, act 706 involves determining distances between the plurality of data points in the feature space and the label space. Act 706 can involve determining a Euclidean distance between feature vectors corresponding to the plurality of data points in the feature space. Act 706 can also involve determining a Euclidean distance between output values corresponding to the plurality of data points in the label space.

Act 706 can involve identifying, for a candidate prototype of the plurality of data points, a subset of data points within an epsilon ball size relative to the candidate prototype within the feature space. Act 706 can then involve determining distances between the candidate prototype and the subset of data points within the label space.

The series of acts 700 also includes an act 708 of determining prototypes based on the distances. For example, act 708 involves determining a set of prototypes from the plurality of data points based on the distances between the plurality of data points in the feature space and the label space. Act 708 can involve determining the set of prototypes from the plurality of data points by selecting a prototype from the plurality of data points to represent other data points in the plurality of data points.

Act 708 can involve determining a cost based on the distances between the candidate prototype and the subset of data points within the label space and a total number of prototypes. Act 708 can then involve adding the candidate prototype to the set of prototypes based on the cost.

Act 708 can further involve determining that a cost to add a first data point of the plurality of data points to the set of prototypes is less than a cost to add a second data point of the plurality of data points to the set of prototypes. Act 708 can also involve adding the first data point to the set of prototypes. Furthermore, act 708 can involve re-ranking a remaining subset of data points based on a corresponding cost of adding each data point of the remaining subset of data points to the set of prototypes and selecting a highest ranking data point as a prototype.

Additionally, act 708 can involve adding a first data point of the plurality of data points to the set of prototypes. Act 708 can then involve determining that a second data point of the plurality of data points is within an epsilon ball of the first data point and excluding the second data point as a candidate prototype.

The series of acts 700 further includes an act 710 of determining an impact of the features. For example, act 710 involves determining, using the set of prototypes, an impact of the features within the machine-learning model. Specifically, act 710 can involve determining how each feature of the features affects the plurality of outputs of the machine-learning model.

Act 710 can involve determining, for a selected data point of the plurality of data points, an adjacent prototype to the selected data point, and generating a gradient corresponding to the selected data point and the adjacent prototype. Act 710 can then involve determining, using the gradient, the impact of the features of the plurality of data points within the machine-learning model.

Act 710 can involve determining a number of prototypes in a first region of the feature space or the label space and a number of prototypes in a second region of the feature space or the label space. Act 710 can then involve determining the impact of the features of the plurality of data points based on the number of prototypes in the first region and the second region.

Additionally, act 710 can involve determining, for a selected data point of the plurality of data points, a plurality of adjacent prototypes to the selected data point in the label space. Act 710 can involve analyzing the plurality of adjacent prototypes to determine a mean and a variance of the plurality of adjacent prototypes in the label space. Act 710 can then involve determining, based on the mean and the variance of the plurality of adjacent prototypes in the label space, the impact of the features of the plurality of data points within the machine-learning model. Furthermore, act 710 can involve determining a bias of the selected data point by determining a distance between the selected data point and the mean in the label space, and then determining the impact of the features of the plurality of data points based on the bias of the selected data point.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
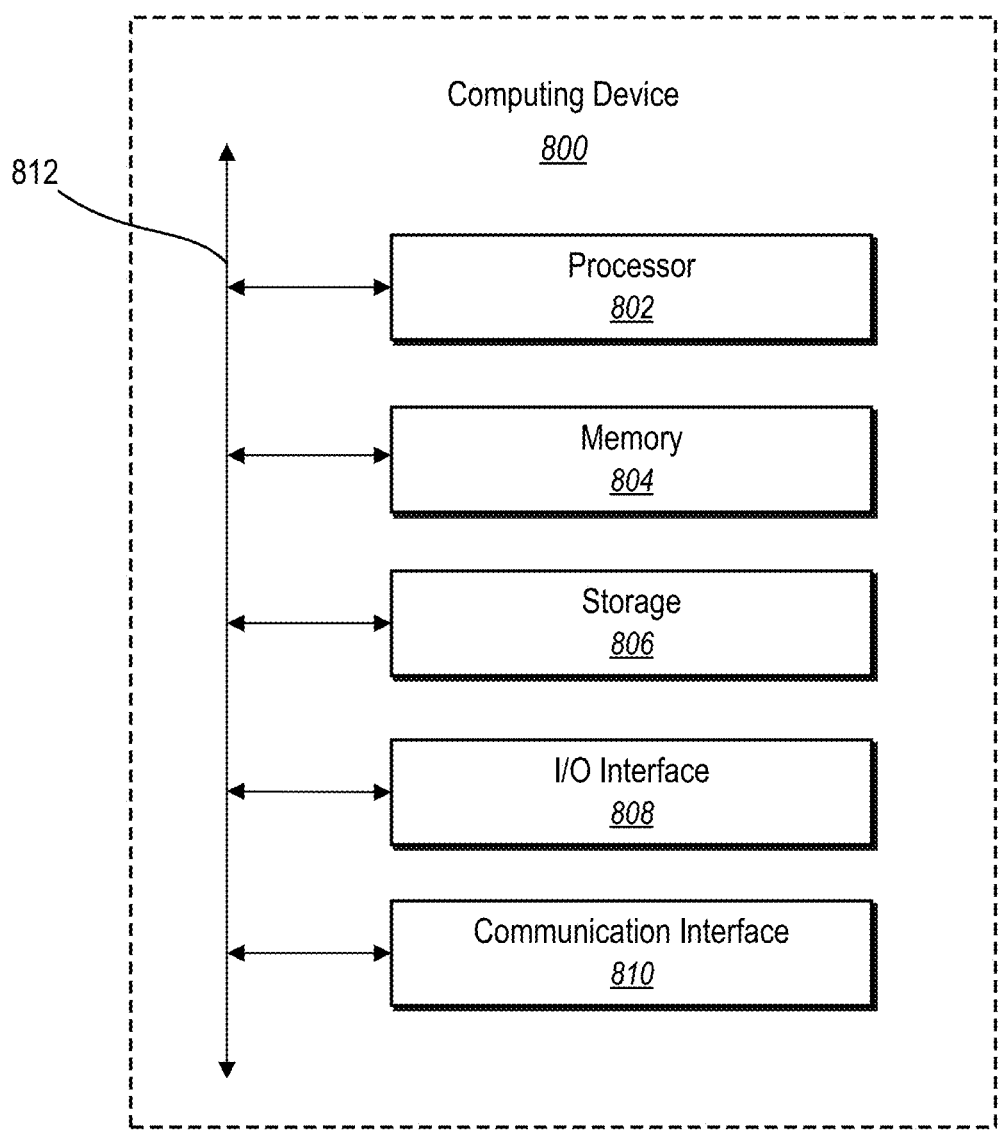
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the model analysis system 102. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for machine-learning interpretation, a computer-implemented method of prototype selection and analysis to determine feature sensitivity comprising:
    determining a set of prototypes by:
        mapping, by at least one processor, features of a plurality of data points to a feature space and a plurality of outputs generated via a machine-learning model from the plurality of data points to a label space;
        determining, by the at least one processor, distances between the plurality of data points in the feature space and the label space; and
        determining, by the at least one processor, the set of prototypes from the plurality of data points based on the distances between the plurality of data points in the feature space and the label space; and
    determining, by the at least one processor using the set of prototypes, an impact of the features within the machine-learning model by generating a plurality of gradients for the plurality of data points and corresponding adjacent prototypes of the set of prototypes, wherein a gradient of the plurality of gradients for a data point in the label space is based on two adjacent prototypes corresponding to two model predictions on two sides of the data point along a single axis in the label space.

2. The computer-implemented method as recited in claim 1, wherein generating the plurality of gradients for the plurality of data points and the two adjacent prototypes of the set of prototypes comprises:
    determining, for the data point in the label space, a first adjacent prototype of the two adjacent prototypes to the data point, the first adjacent prototype comprising a first value in the label space lower than a value of the data point in the label space;
    determining, for the data point, a second adjacent prototype of the two adjacent prototypes to the data point, the second adjacent prototype comprising a second value in the label space higher than the value of the data point in the label space;
    generating the gradient along the first adjacent prototype and the second adjacent prototype; and
    determining, using the gradient, the impact of the features of the plurality of data points within the machine-learning model.

3. The computer-implemented method as recited in claim 1, wherein determining the impact of the features within the machine-learning model comprises:
    determining a number of prototypes in a first region and a number of prototypes in a second region of the feature space or the label space; and
    determining the impact of the features of the plurality of data points based on the number of prototypes in the first region and the second region.

4. The computer-implemented method as recited in claim 1, wherein determining the impact of the features within the machine-learning model comprises:
    determining, for the data point in the label space, a plurality of prototypes comprising the two adjacent prototypes to the data point within the label space;
    analyzing the plurality of prototypes to determine a mean and a variance of the plurality of prototypes; and
    determining, based on the mean and the variance of the plurality of prototypes in the label space, the impact of the features of the plurality of data points within the machine-learning model.

5. A non-transitory computer readable storage medium comprising instructions that, when executed by at least one processor, cause a computer system to:
    determine a set of prototypes by:
        identifying features of a plurality of data points used to generate a plurality of outputs via a machine-learning model;
        mapping the features of the plurality of data points to a feature space and the plurality of outputs to a label space;
        determining distances between the plurality of data points in the feature space and the label space; and
        determining the set of prototypes from the plurality of data points based on the distances between the plurality of data points in the feature space and the label space; and
    determine, using the set of prototypes, an impact of the features within the machine-learning model by:
        generating a plurality of gradients for the plurality of data points, the plurality of gradients comprising, for a selected data point of the plurality of data points, a gradient based on a first adjacent prototype with a first model prediction lower than a model prediction of the selected data point and a second adjacent prototype with a second model prediction higher than the model prediction of the selected data point; and
        determining rank orders for the features of the plurality of data points according to locally sensitive directions of the features based on the plurality of gradients.

6. The non-transitory computer readable storage medium as recited in claim 5, wherein the instructions that cause the computer system to determine distances between the plurality of data points in the feature space and the label space cause the computer system to:

identify, for a candidate prototype of the plurality of data points, a subset of data points within an epsilon ball size relative to the candidate prototype within the feature space; and determine distances between the candidate prototype and the subset of data points within the label space according to corresponding model predictions for the candidate prototype and the subset of data points.

7. The non-transitory computer readable storage medium as recited in claim 6, wherein the instructions that cause the computer system to determine the set of prototypes from the plurality of data points cause the computer system to:

determine a cost based on the distances between the candidate prototype and the subset of data points within the label space and a total number of prototypes; and add the candidate prototype to the set of prototypes based on the cost.

8. The non-transitory computer readable storage medium as recited in claim 5, wherein the instructions that cause the computer system to determine the set of prototypes from the plurality of data points cause the computer system to:

determine that a cost to add a first data point of the plurality of data points to the set of prototypes is less than a cost to add a second data point of the plurality of data points to the set of prototypes; and add the first data point to the set of prototypes.

9. The non-transitory computer readable storage medium as recited in claim 5, wherein the instructions that cause the computer system to determine the set of prototypes from the plurality of data points cause the computer system to:

add a first data point of the plurality of data points to the set of prototypes;

determine that a second data point of the plurality of data points is within an epsilon ball of the first data point; and exclude the second data point as a candidate prototype.

10. The non-transitory computer readable storage medium as recited in claim 5, wherein the instructions that cause the computer system to determine the impact of the features within the machine-learning model cause the computer system to:

generate the gradient for the selected data point based on a first relative direction from the selected data point to the first adjacent prototype and a second relative direction from the selected data point to the second adjacent prototype; and determine, using the gradient, the impact of the features of the plurality of data points within the machine-learning model.

11. The non-transitory computer readable storage medium as recited in claim 5, wherein the instructions that cause the computer system to determine the impact of the features within the machine-learning model cause the computer system to:

determine a number of prototypes in a first region of the feature space or the label space and a number of prototypes in a second region of the feature space or the label space; and determine the impact of the features of the plurality of data points based on the number of prototypes in the first region and the second region.

12. The non-transitory computer readable storage medium as recited in claim 5, wherein the instructions that cause the computer system to determine the impact of the features within the machine-learning model cause the computer system to:

determine, for the selected data point of the plurality of data points, a plurality of adjacent prototypes to the selected data point in the label space;

analyze the plurality of adjacent prototypes to determine a mean and a variance of the plurality of adjacent prototypes in the label space; and determine, based on the mean and the variance of the plurality of adjacent prototypes in the label space, the impact of the features of the plurality of data points within the machine-learning model.

13. The non-transitory computer readable storage medium as recited in claim 12, wherein the instructions that cause the computer system to determine the impact of the features within the machine-learning model cause the computer system to:

determine a bias of the selected data point by determining a distance between the selected data point and the mean in the label space; and determine the impact of the features of the plurality of data points based on the bias of the selected data point.

14. In a digital medium environment for machine-learning interpretation, a system for prototype selection and analysis to determine feature sensitivity comprising:

at least one processor; and a non-transitory computer memory comprising:

a plurality of data points used to generate a plurality of outputs via a machine-learning model, and instructions that, when executed by the at least one processor, cause the system to:

map features of the plurality of data points to a feature space and the plurality of outputs to a label space;

identify a set of prototypes by:

determining a subset of data points within a threshold distance relative to a first data point of the plurality of data points within the feature space; and adding the first data point to the set of prototypes based on distances between the first data point and the subset of data points in the label space; and determine, using the set of prototypes, an impact of the features within the machine-learning model by generating a plurality of gradients for the plurality of data points and corresponding adjacent prototypes of the set of prototypes, wherein a gradient of the plurality of gradients for a data point in the label space is based on two adjacent prototypes corresponding to two model predictions on two sides of the data point along a single axis in the label space.

15. The system as recited in claim 14, wherein the instructions that, when executed by the at least one processor, cause the system to determine the impact of the features within the machine-learning model cause the system to:

determine, for the data point in the label space, a first adjacent prototype of the two adjacent prototypes to the data point within the label space, the first adjacent prototype comprising a first model prediction in the label space lower than a second model prediction in the label space;

determine, for the data point, a second adjacent prototype of the two adjacent prototypes to the data point, the second adjacent prototype comprising a second model prediction in the label space higher than the model prediction of the data point in the label space;

generate the gradient based on the first adjacent prototype and the second adjacent prototype; and determine, using the gradient, the impact of the features of the plurality of data points within the machine-learning model.

16. The system as recited in claim 14, wherein the instructions that cause the system to determine the impact of the features within the machine-learning model cause the system to:
   determine a number of prototypes in a first region and a number of prototypes in a second region of the feature space or the label space; and
   determine the impact of the features of the plurality of data points in the first region and the second region based on the number of prototypes in the first region and the second region.

17. The system as recited in claim 14, wherein the instructions that cause the system to determine the impact of the features within the machine-learning model cause the system to:
   determine, for the data point in the label space, a plurality of prototypes comprising the two adjacent prototypes to the data point in the label space;
   analyze the plurality of prototypes to determine a mean and a variance of the plurality of prototypes in the label space; and
   determine, based on the mean and the variance of the plurality of prototypes in the label space, the impact of the features of the plurality of data points within the machine-learning model.

18. The system as recited in claim 17, wherein the instructions that cause the system to determine the impact of the features within the machine-learning model cause the system to:
   determine a bias of the data point by determining a distance between the data point and the mean in the label space; and
   determine the impact of the features of the plurality of data points based on the bias of the data point.

19. The system as recited in claim 14, wherein the instructions that cause the system to identify the set of prototypes cause the system to:
   determine a cost based on the distances between the first data point and the subset of data points in the label space and a total number of prototypes; and
   add the first data point to the set of prototypes based on the cost.

20. The system as recited in claim 19, wherein the instructions that cause the system to identify the set of prototypes cause the system to:
   identify, for a second data point of the plurality of data points, a second subset of data points within the threshold distance relative to the second data point within the feature space;
   determine distances between the second data point and the second subset of data points within the label space; and
   determine a cost associated with adding the second data point to the set of prototypes based on the distances between the second data point and the second subset of data points and the total number of prototypes including the first data point as a prototype within the set of prototypes.

* * * * *